(12) United States Patent  (10) Patent No.: US 9,288,331 B2
Mauchly et al.  (45) Date of Patent: Mar. 15, 2016

(54) SYSTEM AND METHOD FOR MUTING AUDIO ASSOCIATED WITH A SOURCE (75) Inventors: J. William Mauchly, Berwyn, PA (US); Subrahmanyam V. Kunapuli, Fremont, CA (US); Fei Yang, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 502 days.

(21) Appl. No.: 13/136,990

(22) Filed: Aug. 16, 2011

(65) Prior Publication Data

US 2013/0044893 A1   Feb. 21, 2013

(51) Int. Cl.
*H04R 3/00* (2006.01)
*H04M 3/56* (2006.01)
*H04N 7/15* (2006.01)

(52) U.S. Cl.
CPC ............ *H04M 3/568* (2013.01); *H04N 7/15* (2013.01); *H04M 3/564* (2013.01); *H04M 2203/509* (2013.01); *H04M 2203/5072* (2013.01)

(58) Field of Classification Search
CPC .... H04R 2430/25; H04R 3/005; H04R 1/406; H04M 3/56; H04M 3/567–3/568

USPC .................. 381/92, 122; 379/202.01, 204.01
See application file for complete search history.

(56) References Cited

U.S. PATENT DOCUMENTS

| 4,712,231 | A | * | 12/1987 | Julstrom ................ 379/202.01 |
| 6,192,395 | B1 | * | 2/2001 | Lerner et al. ................. 709/204 |
| 7,843,486 | B1 | | 11/2010 | Blair et al. |
| 2003/0063573 | A1 | * | 4/2003 | Vandermersch ............. 370/260 |
| 2005/0135280 | A1 | * | 6/2005 | Lam ............................ 370/260 |
| 2006/0075422 | A1 | * | 4/2006 | Choi et al. ....................... 725/18 |
| 2007/0147644 | A1 | * | 6/2007 | Bodley et al. ................. 381/334 |
| 2007/0273585 | A1 | * | 11/2007 | Sarroukh et al. ............. 342/379 |
| 2008/0240237 | A1 | | 10/2008 | Tian et al. |
| 2009/0256901 | A1 | | 10/2009 | Mauchly et al. |
| 2009/0324023 | A1 | | 12/2009 | Tian et al. |
| 2010/0123770 | A1 | | 5/2010 | Friel et al. |
| 2013/0022216 | A1 | * | 1/2013 | Ganong et al. ................. 381/92 |

* cited by examiner

*Primary Examiner* — Joseph Saunders, Jr.
*Assistant Examiner* — James Mooney
(74) *Attorney, Agent, or Firm* — Cindy Kaplan (57) ABSTRACT

In one embodiment, a method includes receiving audio at a plurality of microphones, identifying a sound source to be muted, processing the audio to remove sound received from the sound source at each of the microphones, and transmitting the processed audio. An apparatus is also disclosed.

20 Claims, 8 Drawing Sheets

SYSTEM AND METHOD FOR MUTING AUDIO ASSOCIATED WITH A SOURCE

TECHNICAL FIELD

The present disclosure relates generally to processing audio in a communication system.

BACKGROUND

Teleconferencing has become increasingly popular as a means to reduce travel expense and enhance collaboration between people from distributed geographic locations. In a large teleconference room there may be any number of microphones.

In conventional systems, when one microphone is muted, all of the microphones are muted and no audio is emitted. Rather than muting all audio, a user may want to mute just their microphone, so that they can have a side conversation, for example. However, the sound of the user's voice may leak into other microphones in the room. This may result in people thinking that they cannot be heard, when in fact, other microphones pick up their voice and transmit it over the teleconference.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises receiving audio at a plurality of microphones, identifying a sound source to be muted, processing the audio to remove sound received from the sound source at each of the microphones, and transmitting the processed audio.

In another embodiment, an apparatus generally comprises a processor for receiving audio from a plurality of microphones, identifying a sound source to be muted, processing the audio to remove sound received from the sound source at each of the microphones, and transmitting the processed audio. The apparatus further includes memory for storing an identifier of the sound source to be muted.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein allow a user to remove their voice from audio output from a plurality of microphones by selecting a mute option (source-aware audio mute). For example, sound associated with a user or a zone may be removed from audio received at all microphones in a conference room to allow one or more users to talk freely without being heard by participants of the teleconference at other locations, without muting the entire conference room.

The term 'teleconference' as used herein refers to a meeting, conference (e.g., video conference, audio conference), broadcast, telecast, or any other communication session between a plurality of users transmitted using any audio or video means, including signals, data, or messages transmitted through voice or video devices. Audio, video, data, or any combination thereof (e.g., multimedia) may be transmitted in the teleconference. The media may be encrypted, compressed, or encoded according to any format.

The embodiments operate in the context of a data communications network including multiple network devices (nodes). Some of the devices in the network may be call managers, service points, media sources, media receivers, media processing units, media experience engines, multimedia transformation units, multipoint conferencing units, appliances, switches, routers, gateways, servers, or other network devices.

Figure 1:
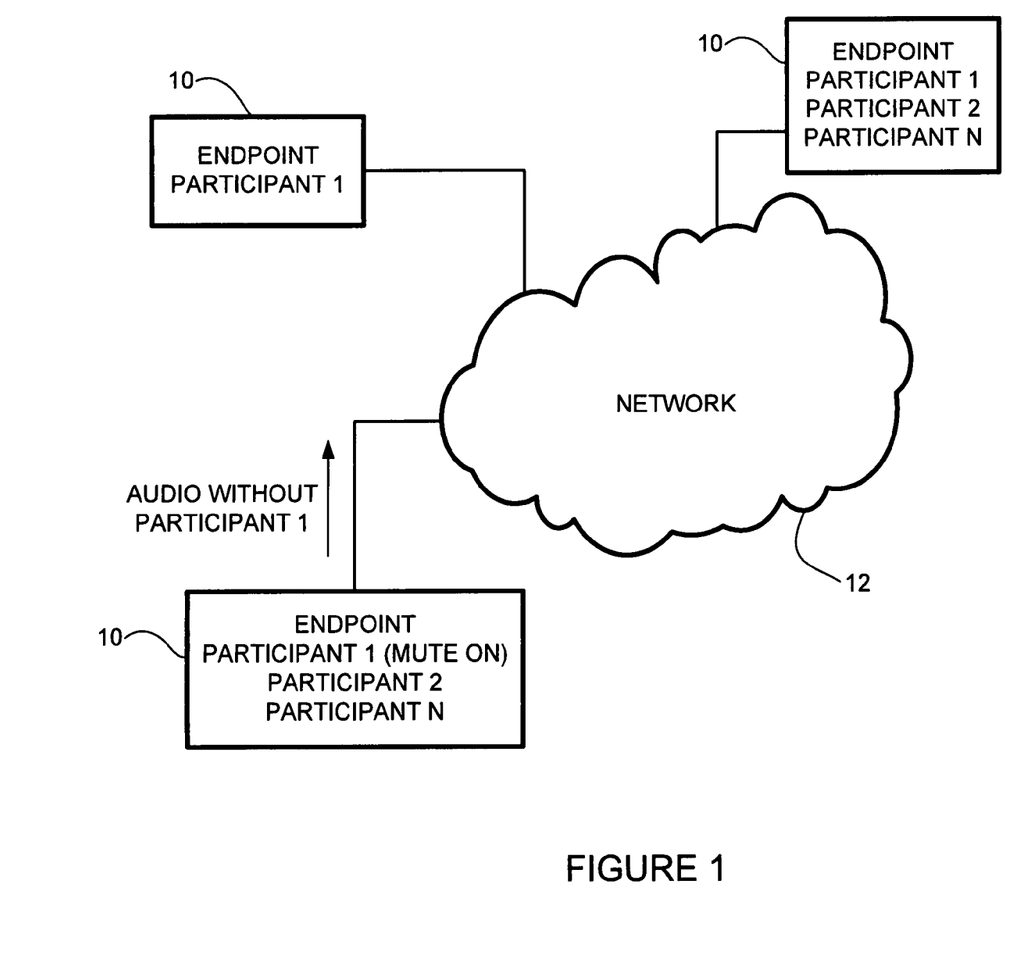
FIG. 1 illustrates an example of a network in which embodiments described herein may be implemented.

Referring now to the drawings, and first to FIG. 1, an example of a network in which embodiments described herein may be implemented is shown. A plurality of endpoints (e.g., media sources/receivers) 10 are in communication via network 12. The network 12 may include one or more networks (e.g., local area network, wireless local area network, radio access network, public switched network, virtual local area network, virtual private network, metropolitan area network, wide area network, enterprise network, Internet, intranet, or any other network). The nodes 10 are connected via communication links. Media flow paths between the endpoints 10 may include any number or type of intermediate nodes, which facilitate passage of data between the nodes.

The endpoints 10 are configured to originate or terminate communications over the network 12. The endpoints 10 may be any device or combination of devices configured for receiving, transmitting, or receiving and transmitting media. For example, the endpoint 10 may be a media center device (e.g., TelePresence device), mobile device (e.g., phone, personal digital assistant), personal computer, or any other device capable of engaging in audio, video, or data exchanges within the network 12. There may be one or more participants (users) located at or associated with each endpoint 10. As described in detail below, a participant (e.g., participant 1 at one of the endpoints 10 in FIG. 1) may want to remove their voice from the teleconference, in which case audio from the endpoint is transmitted to the other endpoints without sound from that participant.

It is to be understood that the network shown in FIG. 1 and described above is only an example and that the embodiments described herein may be implemented in networks having different network topologies and network devices, without departing from the scope of the embodiments.

Figure 2:
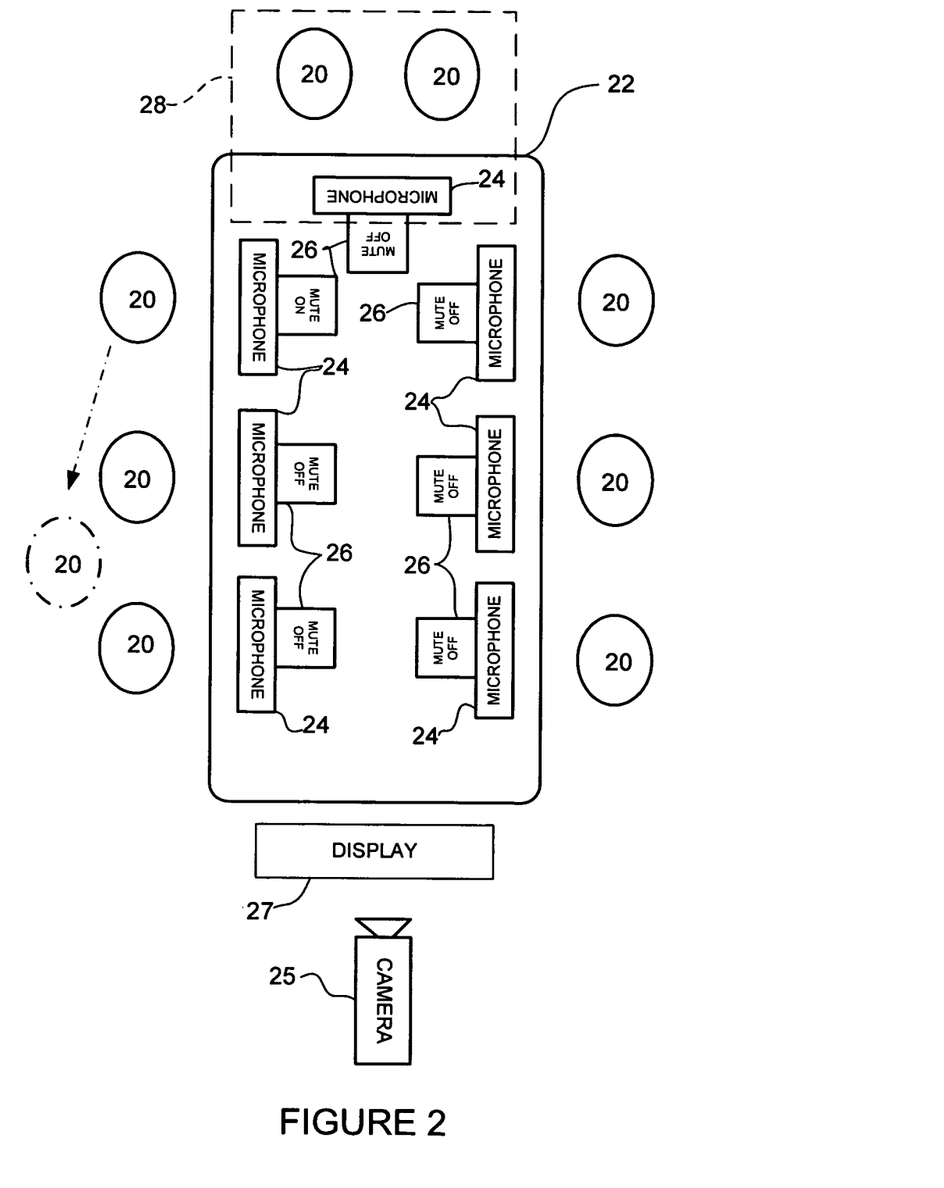
FIG. 2 illustrates a top view of an example of a conference room containing a teleconference system operating as an endpoint in the network of FIG. 1.

FIG. 2 is a schematic top view of an example of a conference room arrangement used for a teleconference. Participants 20 may be seated around a table 22 or may be standing or walking around the room. For example, one participant 20 may leave his chair and go over to have a side conversation with other participants, as shown in FIG. 2. One or more cameras 25 are located in the conference room and preferably positioned to view most of the room. As described below, the camera 25 may be used to track participants in the room for use in identifying a sound to be muted. The room also includes a display screen 27 located at one end of the conference room. The display screen 27 may be located, for example, below the camera 25. A plurality of microphones 24 are positioned on the table 22. Each microphone 24 may be positioned in front of one or more participants 20. One or more microphones 24 may also be associated with a zone 28 in the conference room. For example, the zone 28 may be a segment of the table 22 at which two people 20 and one microphone 24 are located, as shown in FIG. 2.

In one embodiment, each microphone 24 includes a user interface 26 for use in selecting a mute option. The user interface 26 may be an on/off button or switch, a selection on a keypad (physical keypad or touch screen), or any other interface operable to receive input from a user and initiate a mute mode of operation.

The user interface 26 may be integral with the microphone 24 or separate from the microphone. For example, the user interface 26 may be a switch on the microphone 24 or located on the table 22 near one of the microphones 24. The user interface 26 may also be a movable device (e.g., device with a 'mute me' button) that a user can hold and carry when he moves around the room. The user interface 26 may be associated with one of the microphones 24, a zone 28, or a user 20, for example.

The user interface 26 is configured to provide input to a processing system through the microphone 24 connected to (or associated with) the user interface or via direct input to the processing system (e.g., wireless signal received at the processing system). Muting of the microphone 24 prevents sound from a sound source (e.g., participant 20 or participants within zone 28) from being transmitted not only from the muted microphone, but all other microphones in the conference room. As described below, audio from the muted microphone may be used in the processing system to remove sound from the sound source received at the non-muted microphones. Thus, the term 'muted microphone' as used herein refers to a microphone associated with a sound source to be muted ('muted sound source').

In one embodiment, the microphones 24 are located at fixed positions on the table 22 so that the processing system can use a two-dimensional overhead mapping of a location of the sound source relative to the microphones for use in identifying a sound received from the sound source. As described below, the processing system is coupled to the microphones 24 and may be configured to generate audio data and direction information indicative of the direction of sound received at the microphones. Many methods of determining the direction of a sound using a plurality of microphones are known by those skilled in the art, and the embodiments described herein are not limited to any particular method.

It is to be understood that the arrangement shown in FIG. 2 is only an example and other arrangements may be used without departing from the scope of the embodiments. For example, one or more embodiments may be implemented using an audio conference system with microphones 24 and no video equipment (e.g., camera 25, display 27). Also, the system described herein may be used at locations other than conference rooms.

Figure 3:
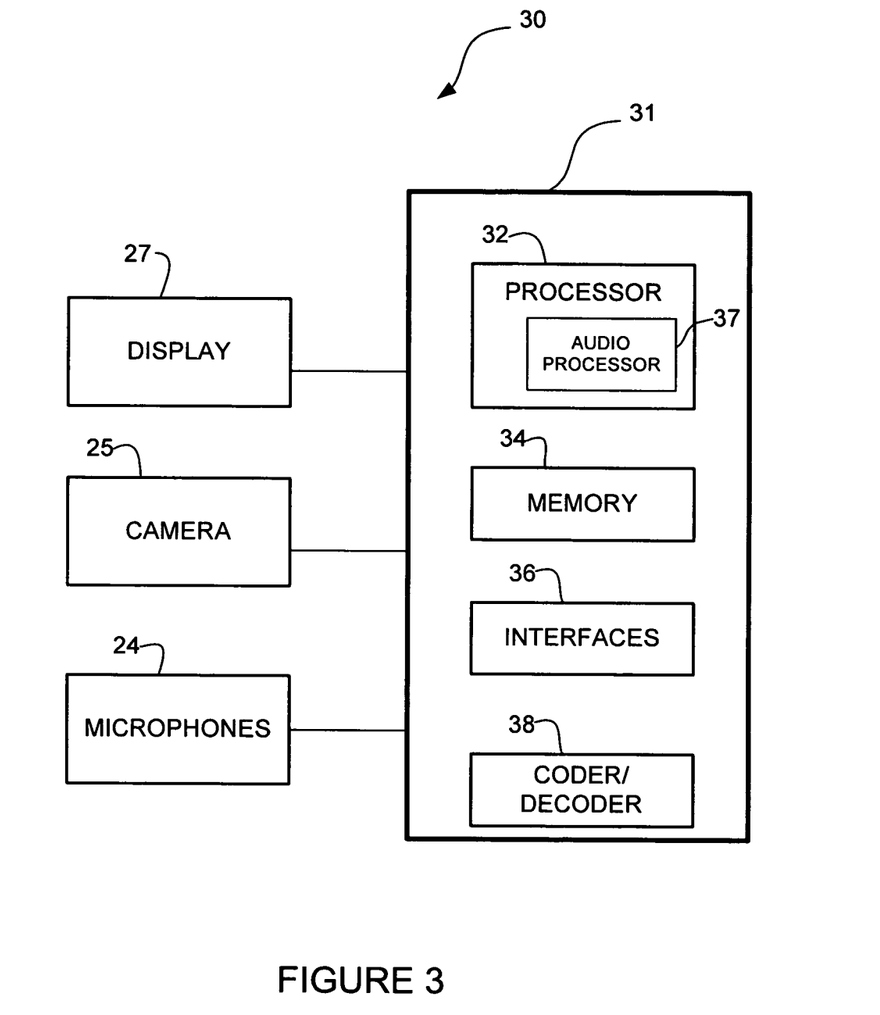
FIG. 3 is a block diagram of the system used in the conference room shown in FIG. 2, in accordance with one embodiment.

FIG. 3 is a block diagram illustrating an example of a system (e.g., teleconferencing system) 30 that may be used to implement embodiments described herein. The system 30 is connected to network 12 and one or more endpoints 10 as described above with respect to FIG. 1. The system 30 may include one or more video cameras 25, display 27, microphones 24, and processing system 31. The processing system 31 includes a processor 32, memory 34, interfaces 36, and coder/decoder subsystem 38. The processing system 31 is a programmable machine that may be implemented in hardware, software, or any combination thereof.

Memory 34 may be a volatile memory or non-volatile storage, which stores various applications, modules, and data for execution and use by the processor 32. Memory may store, for example, an identifier of the sound source to be muted. The identifier may identify a person, a zone in which the sound source is located, or a microphone associated with the zone or sound source, for example.

Logic may be encoded in one or more tangible computer readable media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The processor 32 includes an audio processor 37 configured to process audio to remove sound from a sound source. The audio processor 37 is operable, for example, to process audio signals, determine the direction of a sound, separate out different signals (voices), and subtract (cancel, filter) signals of a muted sound source, as described in detail below. In one embodiment, the audio processor 37 first digitizes the sound received from all of the microphones individually, without summing.

The interfaces 36 may comprise any number of wireless or wired interfaces (linecards, ports) for receiving signals or data or transmitting signals or data to other devices. The interfaces 36 may include, for example, an Ethernet interface for connection to a computer or network.

The coder/decoder subsystem 38 may include for example, an audio codec and video codec configured to accept audio and video signals and compress the audio and video for transmission to other endpoints 10 of the teleconference.

The processing system 31 may further include any suitable combination of hardware, software, algorithms, processors, devices, components, or elements operable to facilitate the capabilities described herein. The processing system 31 may be located in a conference room or any other location in a communication path between the endpoints 10.

It is to be understood that the system 30 shown in FIG. 3 and described above is only one example and that different components and configurations may be used, without departing from the scope of the embodiments. For example, as noted above, one or more embodiments may not include camera 25 or display 27.

Figure 4:
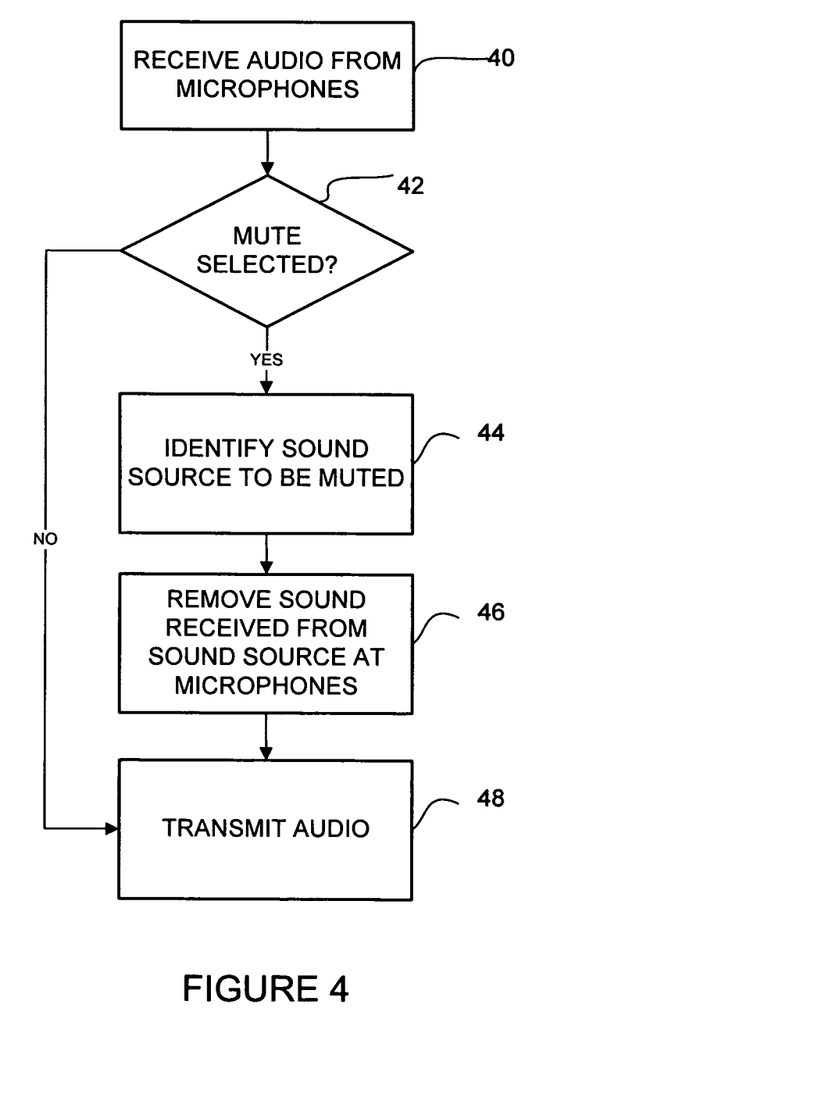
FIG. 4 is a flowchart illustrating an overview of a process for muting audio associated with a sound source, in accordance with one embodiment.

FIG. 4 is a flowchart illustrating an overview of a process for muting audio associated with a source, in accordance with one embodiment. At step 40 the processing system 31 receives audio from a plurality of microphones 24 (FIGS. 3 and 4). One or more participants may select a mute option to remove their voice from an audio output (step 42). The processing system identifies the sound source to be muted (step 44). As described below, the sound source may be a person 20 setting his microphone 24 to mute (or otherwise selecting an option to mute his voice), or one or more persons or other sound source located within a zone 28 in a room. The system processes the audio to remove sound received from the sound source at each of the microphones 24 (step 46). Sound received from the sound source may be removed from the audio at any point during processing of the audio. The processing system outputs an audio signal or signals which contain the summed sound of the individual speakers in the room, minus sound from the muted sound source. The audio may be transmitted to other endpoints in a teleconference, for example (step 48).

Figure 5:
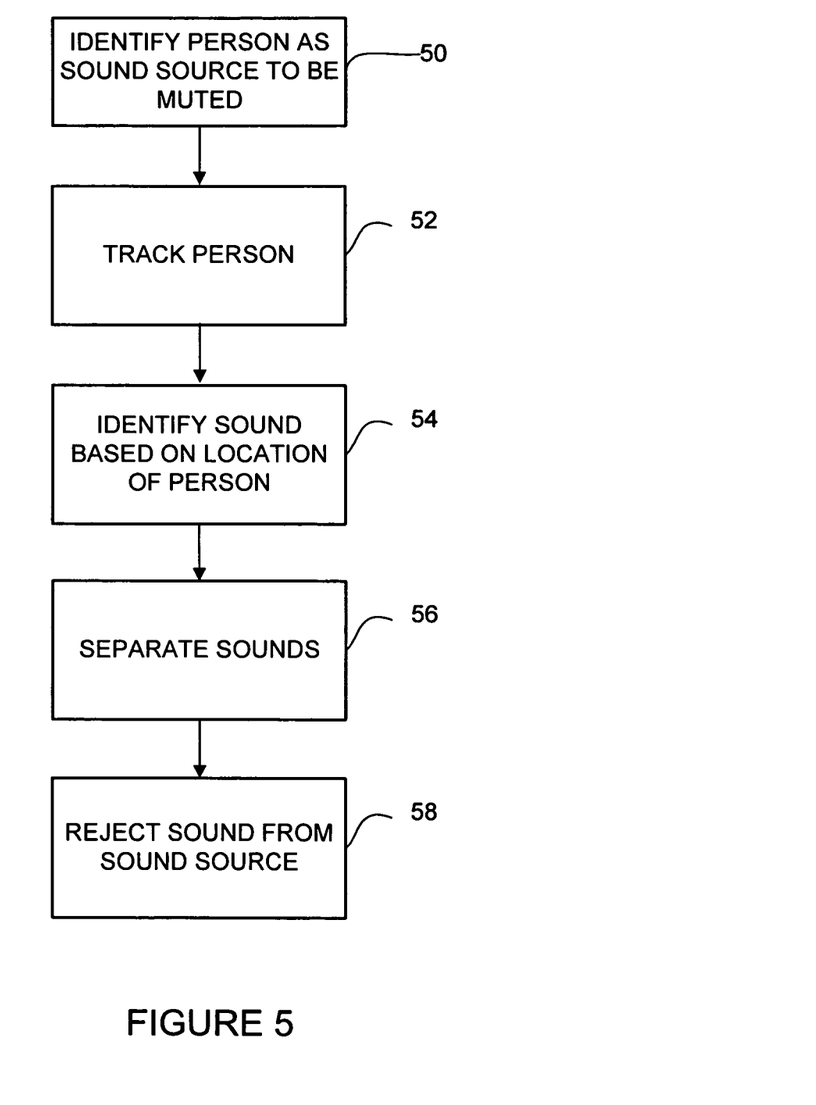
FIG. 5 is a flowchart illustrating details for identifying and removing the sound source in the process shown in FIG. 4, in accordance with one embodiment.

FIG. 5 is a flowchart illustrating one example of a process for identifying and removing the sound source (steps 44 and 46 of FIG. 4). In one embodiment, the camera 25 detects a person associated with the microphone that was muted or that selected a mute option (step 50). The camera 25 is used to track the person in the room (step 52). The system associates the person (visually detected face or face and body) with a voice (audio detected sound source). This pairing is periodically updated according to the audio/video scene presented. For example, if the person changes his location within the room, information received from the camera 25 will be used to identify the location of the sound source. The audio is processed to generate audio data and direction information indicative of the direction of sound received at the microphones 24. The location of a person 20 may be mapped relative to the microphones 24 and the approximate distance and angle from the microphones used to identify sound received from the person (step 54). The sound that is identified as coming from the person is separated from the other audio received at the microphones and rejected (steps 56 and 58).

The following describes examples of methods for tracking the muted sound source (step 52 in FIG. 5). In one embodiment, background subtraction is used to isolate foreground objects. Other people tracking techniques that may be used include motion tracking, face detection, or stereo (depth) cameras that use infrared light, for example. The face detection may include reporting the position of a person as an x, y coordinate, for example. Many face detection methods are known by those skilled in the art and may be used. For example, face detection may include eye detection or fitting elliptical shapes to edges detected corresponding to a face. Examples of face detection are described in commonly assigned U.S. patent application Ser. No. 12/021,198, filed Jan. 28, 2008 and titled "Real-Time Face Detection", and U.S. patent application Ser. No. 12/031,590, filed Feb. 14, 2008 and titled "Real-Time Face Detection Using Temporal Differences", both of which are incorporated by reference herein, though other face detection algorithms known by those skilled in the art are contemplated to be within the scope of the embodiments. It is to be understood that these are only examples and that other methods may be used to track a person, as are well known by those skilled in the art.

Figure 6:
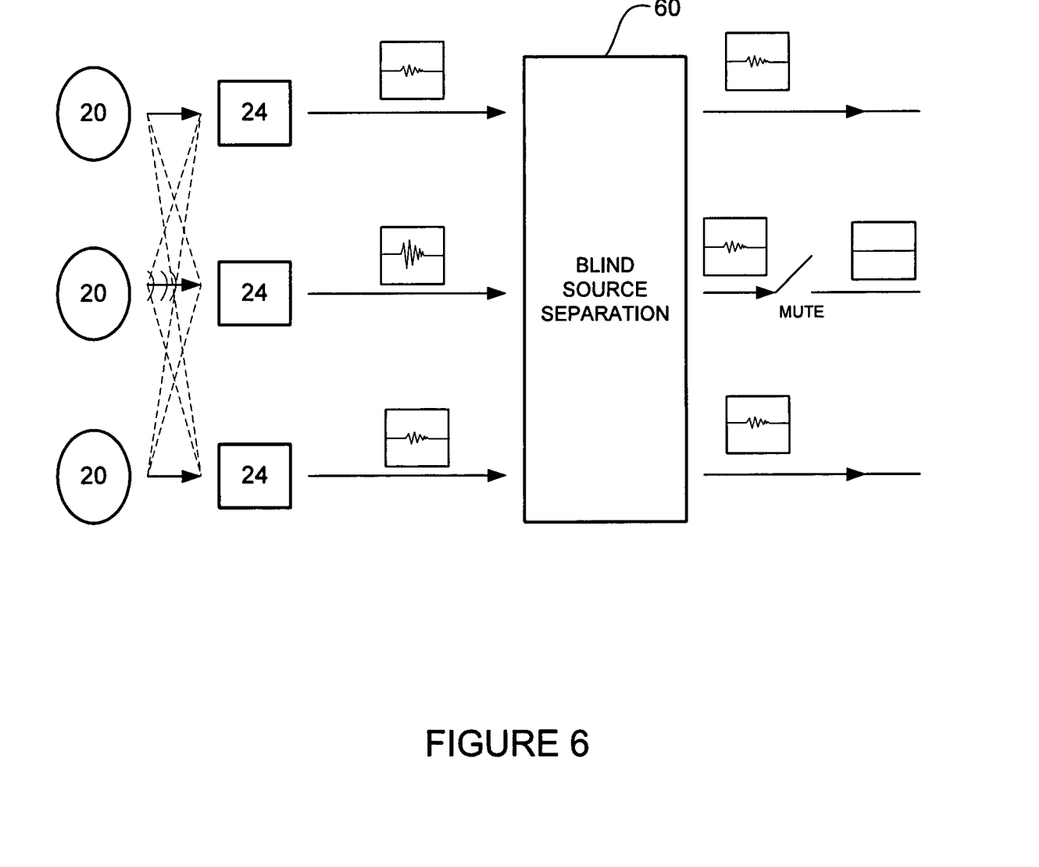
FIG. 6 is a block diagram illustrating a system for use in the process of FIG. 5, in accordance with one embodiment.

FIG. 6 illustrates an example of a system for use in separating sounds (step 56 in FIG. 5). In a teleconferencing environment, a single sound source appears in every microphone signal, but with different volume, reverberation, echo, and frequency response. As shown in FIG. 6, voices from three different participants 20 are received at three microphones 24. In one embodiment, a blind source separation module 60 separates out the different voices. Blind source separation relies on the assumption that the source signals do not correlate with one another. Blind source separation is used to reject the muted sound source from multiple microphones. This may be done, for example, in the time and frequency domain. The magnitude of sound in the different microphones is identified across time and frequency. Energy that correlates in both dimensions is considered to be from the same source. Individual sounds can be isolated based on this grouping. A summation is provided of all of the sound sources except the identified muted sound source. Sound received from the participant 20 requesting to mute his voice is therefore removed from the audio, while the other voices are passed to the output.

Figure 7:
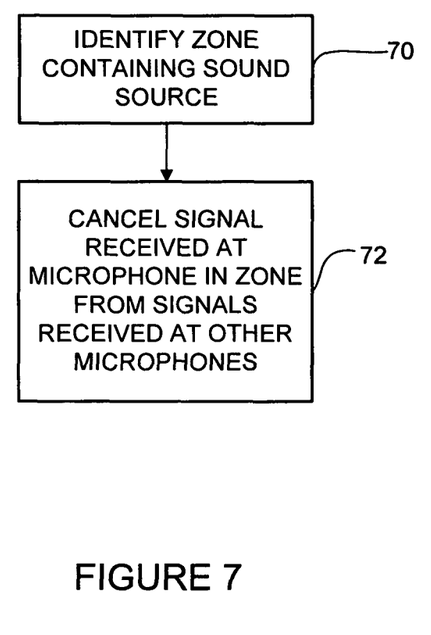
FIG. 7 is a flowchart illustrating details for identifying and removing the sound source in the process shown in FIG. 4, in accordance with another embodiment.

FIG. 7 is a flowchart illustrating another example of a process for identifying and removing a sound source (steps 44 and 46 in FIG. 4). The system identifies a zone 28 containing the sound source to be muted (step 70) (FIGS. 2 and 4). The sound source may be one or more persons 20 located in the zone. The zone 28 may be identified, for example, by muting a microphone 24 located in the zone. Sound received at the microphone 24 is input for use in cancelling sound received from the sound source at other microphones (step 72).

Figure 8:
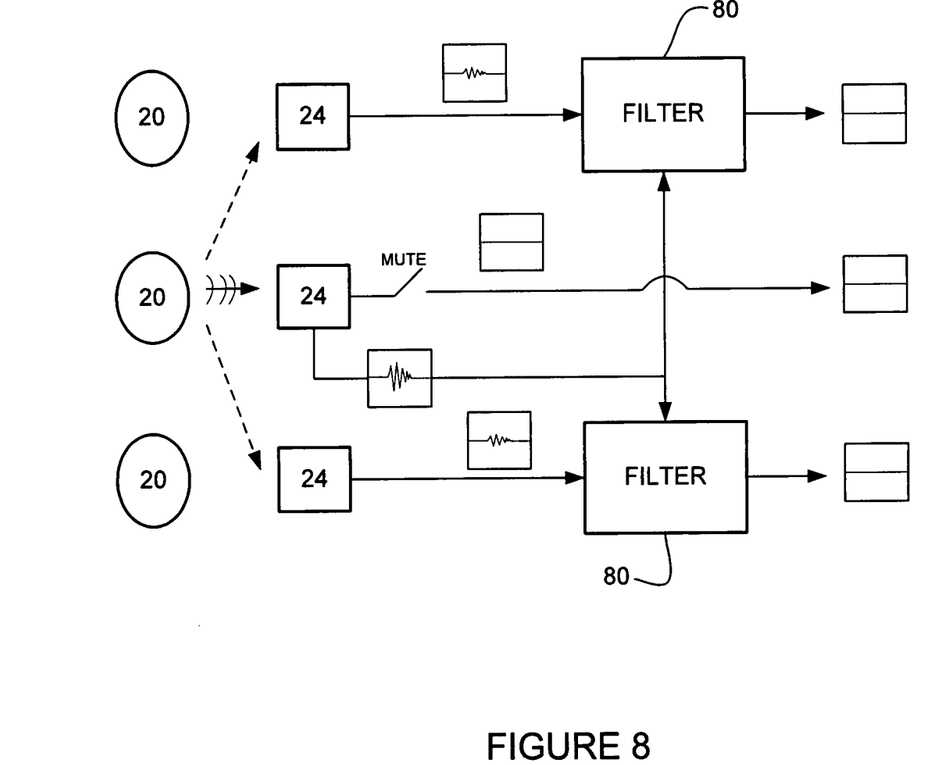
FIG. 8 is a block diagram illustrating a system for use in the process of FIG. 7, in accordance with one embodiment.

FIG. 8 illustrates an example of a system for use in the process shown in FIG. 7. Audio is received from user 20 at microphones 24. One of the microphones 24 is muted and the system removes the sound received at the muted microphone from all other microphones. For example, a signal identified from a sound source at a particular spectrum or frequency may be removed. Rather than trying to isolate a source that may be in several microphones, an algorithm may be used that assumes that the input from the muted microphone is the signal that is to be removed. There may be secondary sounds received at the muted microphone 24 from other locations in the room. However, it is only the primary sound (e.g., largest, strongest signal) that is identified as the sound from the sound source to be removed from the audio input at the other microphones.

As shown in FIG. 8, the input from the muted microphone is used in the processing even though it is not sent out over the network as output. The signal processing may be performed in the frequency domain using a nonlinear adaptive filter 80, for example. The input received at the muted microphone 24 is the signal that is provided to the filter 80 for use in cancelling the signal from the audio received at the other microphones. A process similar to acoustic echo cancellation may be used, for example.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
receiving audio at a plurality of microphones coupled to a processing system, each of said microphones comprising a user interface operable to initiate a mute mode of operation at the processing system based on received input;
associating a sound source with each of said plurality of microphones upon receiving said audio at the microphones;
receiving from one of said microphones, a request to initiate said mute mode of operation at the processing system;

identifying the sound source associated with the microphone, wherein identifying the sound source associated with the microphone comprises identifying a sound with a strongest signal at the microphone as the sound from the sound source to be removed from audio input at said plurality of microphones;

processing the audio to remove sound received from the identified sound source at each of said plurality of microphones at the processing system; and transmitting the processed audio;

wherein said mute mode of operation comprises removing said sound received from the sound source associated with the microphone at each of said plurality of microphones and wherein removing said sound comprises processing said audio received from said plurality of microphones, separating out an audio signal associated with said identified sound source, subtracting said audio signal from said audio received from each of the other microphones, and transmitting an audio signal containing a summed sound received from each of the other microphones with the audio signal associated with the microphone requesting said mute mode of operation removed.

2. The method of claim 1 wherein said plurality of microphones are located at an endpoint in a teleconference.

3. The method of claim 1 wherein identifying the sound source comprises identifying a person, the person associated with one of said microphones.

4. The method of claim 3 further comprising:
tracking the person with a video camera to identify a location of the person; and
using said location of the person to identify said sound to be removed from the audio.

5. The method of claim 1 wherein removing said sound comprises separating signals received at said plurality of microphones and rejecting said sound received from the sound source, wherein separating said signals comprises utilizing blind source separation.

6. The method of claim 1 wherein identifying said sound source comprises identifying a zone containing the sound source.

7. The method of claim 6 wherein removing said sound comprises removing a signal identified from a sound source at a particular spectrum or frequency.

8. An apparatus comprising:
a processor for receiving audio from a plurality of microphones, associating a sound source with each of said plurality of microphones, receiving from one of said microphones, a request to initiate a mute mode of operation, identifying the sound source associated with the microphone upon receiving said audio at the microphone, processing the audio to remove sound received from the identified sound source at each of said plurality of microphones, and transmitting the processed audio; and
memory for storing an identifier of the sound source to be muted;
wherein each of said microphones comprises a user interface operable to initiate a mute mode of operation based on received input, the sound source associated with one of said microphones;
wherein identifying the sound source associated with the microphone comprises identifying a sound with a strongest signal at the microphone as the sound from the sound source to be removed from audio input at said plurality of microphones; and wherein said mute mode of operation comprises removing said sound received from the sound source associated with the microphone at each of said plurality of microphones and wherein removing said sound comprises processing said audio received from said plurality of microphones, separating out an audio signal associated with said identified sound source, subtracting said audio signal from said audio received from each of the other microphones, and transmitting an audio signal containing a summed sound received from each of the other microphones with the audio signal associated with the microphone requesting said mute mode of operation removed.

9. The apparatus of claim 8 wherein said sound source comprises a person.

10. The apparatus of claim 9 wherein the processor is further configured to receive input from a video camera to identify a location of the person and use said location to identify said sound to be removed from the audio.

11. The apparatus of claim 8 wherein removing said sound comprises separating signals received at said plurality of microphones and rejecting said sound received from the sound source.

12. The apparatus of claim 8 wherein said identifier comprises identification of a zone containing the sound source.

13. The apparatus of claim 12 wherein removing said sound comprises cancelling said sound received at one of the microphones located in the zone from sound received at the other microphones.

14. The apparatus of claim 8 further comprising a filter operable to receive input from a muted microphone and another of said microphones and use said input to filter a signal received from said sound source, the filter comprising a nonlinear adaptive filter.

15. An apparatus comprising:
means for associating a sound source with each of said plurality of microphones coupled to a processing system;
means for receiving from one of said microphones, a request to initiate said mute mode of operation at the processing system;
means for identifying the sound source associated with the microphone upon receiving said audio at the microphones, wherein means for identifying the sound source associated with the microphone comprises means for identifying a sound with a strongest signal at the microphone as the sound from the sound source to be removed from audio input at said plurality of microphones; and
means for processing audio received at a plurality of microphones to remove sound received from the identified sound source at each of said plurality of microphones;
wherein each of said microphones comprises a user interface operable to initiate a mute mode of operation based on received input, the sound source associated with one of said microphones; and
wherein said mute mode of operation comprises removing said sound received from the sound source associated with the microphone at each of said plurality of microphones and wherein removing said sound comprises processing said audio received from said plurality of microphones, separating out an audio signal associated with said identified sound source, subtracting said audio signal from said audio received from each of the other microphones, and transmitting an audio signal containing a summed sound received from each of the other microphones with the audio signal associated with the microphone requesting said mute mode of operation removed.

16. The apparatus of claim 15 wherein the sound source comprises a person.

17. The apparatus of claim 16 further comprising means for identifying a location of the person and using said location of the person to identify said sound to be removed from the audio.

18. The apparatus of claim 15 wherein means for processing the audio to remove said sound comprises means for separating signals received at said plurality of microphones and rejecting said sound received from the sound source.

19. The apparatus of claim 15 wherein means for identifying a sound source comprises means for identifying a zone containing the sound source.

20. The apparatus of claim 19 wherein means for processing the audio to remove said sound comprises means for cancelling said sound received at one of the microphones located in the zone from sound received at the other microphones.

* * * * *